(12) United States Patent
Winter

(10) Patent No.: US 7,663,503 B2
(45) Date of Patent: Feb. 16, 2010

(54) METER REGISTER HAVING AN ENCODER FOR MEASURING MATERIAL FLOW AND AN ALGORITHM TO SELECTIVELY BLOCK SIGNAL TRANSMISSION

(75) Inventor: Dan Winter, Pardessia (IL)

(73) Assignee: Arad Measuring Technologies Ltd., Yokneam (IL)

( * ) Notice: Subject to any disclaimer, the term of this patent is extended or adjusted under 35 U.S.C. 154(b) by 427 days.

(21) Appl. No.: 11/581,877

(22) Filed: Oct. 17, 2006

(65) Prior Publication Data

US 2007/0033985 A1  Feb. 15, 2007

Related U.S. Application Data

(62) Division of application No. 10/864,312, filed on Jun. 9, 2004, now Pat. No. 7,135,986.

(60) Provisional application No. 60/478,522, filed on Jun. 13, 2003, provisional application No. 60/478,310, filed on Jun. 13, 2003.

(51) Int. Cl.
*G08C 15/06* (2006.01)

(52) U.S. Cl. .............................. 340/870.02; 340/870.03; 73/40; 73/258; 73/195; 73/196; 324/175

(58) Field of Classification Search .................................
340/870.02–870.03; 73/40, 258, 195–196; 324/175
See application file for complete search history.

(56) References Cited

U.S. PATENT DOCUMENTS

| | | | |
|---|---|---|---|
| 4,194,180 A | 3/1980 | Noren et al. | |
| 4,264,897 A | 4/1981 | Farnsworth | |
| 4,305,281 A | 12/1981 | Lee et al. | |
| 4,327,362 A * | 4/1982 | Hoss ..................... | 340/870.02 |
| 4,481,805 A | 11/1984 | Dobesh | |
| 4,670,737 A | 6/1987 | Rilling | |
| 4,680,704 A * | 7/1987 | Konicek et al. ............. | 382/100 |
| 4,683,472 A * | 7/1987 | Beling .................... | 340/870.02 |
| 4,774,463 A * | 9/1988 | Mizobuchi et al. .......... | 324/175 |
| 4,799,059 A | 1/1989 | Grindahl et al. | |
| 4,827,123 A | 5/1989 | Gray | |

(Continued)

FOREIGN PATENT DOCUMENTS

CN    1125003    6/1996

(Continued)

*Primary Examiner*—Albert K Wong
(74) *Attorney, Agent, or Firm*—The Webb Law Firm

(57) ABSTRACT

A water meter has a meter register having an encoder having electromagnetic wave emitters, e.g., infrared emitters to measure water flow and direction of water flow through the meter. The encoder has two of three spaced emitters directing infrared rays at predetermined time intervals toward a rotating detector wheel having a reflective surface portion and a non-reflective surface portion facing the emitters and an infrared sensor. The reflective surface portion of the detecting wheel reflects the infrared rays incident thereon toward the sensor. A microprocessor connected to the sensor acts on signals from the sensor to determine material flow. The meter register transmits the signal to a distant receiver. The microprocessor of a meter register has an algorithm to prevent the meter register from sending signals until after the meter register or a water meter having a meter register is installed and water moved through the meter.

25 Claims, 3 Drawing Sheets

U.S. PATENT DOCUMENTS

| | | | |
|---|---|---|---|
| 5,111,407 A | | 5/1992 | Galpern |
| 5,261,275 A | * | 11/1993 | Davis .......................... 73/258 |
| 5,284,053 A | | 2/1994 | Wadlow et al. |
| 5,377,529 A | * | 1/1995 | Boyd ............................ 73/40 |
| 5,442,281 A | | 8/1995 | Frisch et al. |
| 5,455,781 A | * | 10/1995 | Reynal et al. ................. 702/82 |
| 5,506,404 A | * | 4/1996 | Milan-Kamski ....... 250/231.14 |
| 5,526,685 A | | 6/1996 | Davis |
| 5,530,258 A | | 6/1996 | Crowne |
| 5,726,646 A | | 3/1998 | Bane et al. |
| 5,747,703 A | * | 5/1998 | Plisson et al. ............ 73/861.77 |
| 5,874,731 A | * | 2/1999 | Swanson ................ 250/214 B |
| 5,874,732 A | | 2/1999 | Giles |
| 5,996,806 A | | 12/1999 | Vikiö |
| 6,133,850 A | | 10/2000 | Moore |
| 6,232,593 B1 | | 5/2001 | Tunisuchi et al. |
| 6,232,885 B1 | * | 5/2001 | Ridenour et al. ....... 340/870.02 |
| 6,271,523 B1 | | 8/2001 | Weaver et al. |
| 7,135,986 B2 | * | 11/2006 | Winter .................. 340/870.02 |
| 2002/0145568 A1 | | 10/2002 | Winter |

FOREIGN PATENT DOCUMENTS

| | | |
|---|---|---|
| FR | 2 850 748 A1 | 6/2004 |
| WO | 9928428 | 6/1999 |
| WO | WO 02/073735 | 9/2002 |

\* cited by examiner

METER REGISTER HAVING AN ENCODER FOR MEASURING MATERIAL FLOW AND AN ALGORITHM TO SELECTIVELY BLOCK SIGNAL TRANSMISSION

CROSS REFERENCE TO RELATED APPLICATIONS

The present invention is a divisional application of U.S. application Ser. No. 10/864,312, filed Jun. 9, 2004 now U.S. Pat. No. 7,135,986, which claims the benefit of U.S. Provisional Application Ser. No. 60/478,522, filed Jun. 13, 2003, and U.S. Provisional Application Ser. No. 60/478,310, filed Jun. 13, 2003, which applications are hereby incorporated by reference in their entirety.

BACKGROUND OF THE INVENTION

1. Field of the Invention

The present invention relates to a meter register having an encoder, e.g., a light or infrared encoder, for measuring material flow, e.g., flow volume, and flow direction of water, and an algorithm to selectively block signal transmission by the meter register, e.g., prevent or block signal transmission, during transport of the meter register and permit or unblock transmission after the meter register is installed, e.g., in a home, and a predetermined amount of water flow has been sensed by the meter register.

2. Description of Related Art

One technique to determine utility consumption is to visually read the utility meters. The meters, such as water meters, include an odometer that identifies the consumption of the water consumed. The odometer is read periodically and the difference between the present and the prior reading determines the amount of utility water used. This procedure of individually and visually reading water meters is time consuming, labor intensive, and expensive. To overcome this drawback, remote reading systems were developed.

One such system is described in PCT Publication No. WO 02/073735 (hereinafter also referred to as "WO 02/073735") to Winter and titled "Meter Register." The meter register disclosed in WO 02/073735 is a sealed meter register and includes a magnetic follower coupled to a gear. The gear includes a magnet that co-acts with one or more reed switch sensors. The reed switch sensors are coupled to a circuit board which determines the volume that flows through the meter by counting the number of pulses created by the magnet co-acting with the reed switches. Then, the register circuitry creates a signal that causes a radio wave to be transmitted or emitted by the meter register and picked up by a transmitter external of the meter register.

Although the meter register of WO 02/073735 is acceptable, there are limitations. More particularly, the use of reed switches and magnets on a wheel are rather expensive and, due to their mechanical nature, can fail in the field. As can be appreciated by those skilled in the art, it would be advantageous to provide a meter register that does not have these limitations.

Another limitation of the meter register of WO 02/073735 is that, after calibration of the meter register, it continues to transmit a radio signal. Presently, the Federal Communications Commission (FCC) of the United States limits the ability of the registers to transmit their signal prior to installation. Specifically, under the FCC rules, the register is not permitted to transmit radio signals until the meter is installed for operation. In a sealed meter environment, this is very difficult since the meter register cannot be easily modified once constructed and sealed.

As can be appreciated by those skilled in the art, it would be advantageous to provide a sealed meter register that only transmits signals after it has been installed.

SUMMARY OF THE INVENTION

The invention relates to a meter register that includes a meter body having a rotatable drive shaft coupled thereto. A wheel co-acts with the drive shaft and is rotatable. The wheel includes a reflective portion and a non-reflective portion. At least one, and preferably three light emitters, such as infrared sensors, are spaced from the rotatable shaft so that the emitters emit light onto the rotatable wheel spaced approximately 120° apart. A light sensor is provided to detect reflective light from the emitters off of the wheel. The sensor is coupled to a microprocessor to determine if reflected light is reflected thereon. A microprocessor controls the emission of the light emitters so that the microprocessor can determine which of the light emitters reflects off of the wheel. Depending on the reflection of light off of the wheel over a period of time, the microprocessor can determine the direction of flow through a meter on which the register is attached.

Further, the invention relates to a meter register having an encoder, such as an optical encoder, responsive to material flow, e.g., water flow. The encoder includes a sensor responsive to one or more wavelengths of the electromagnetic spectrum, e.g., infrared energy or visible light. The sensor having a perimeter, a plurality of devices mounted in a fixed spaced relationship to one another, and to the perimeter of the sensor, each of the devices are capable of generating the one or more wavelengths of the electromagnetic spectrum, e.g., infrared energy or visible light. A member mounted to rotate about an axis and having a major surface, with the major surface spaced from and facing the sensor and the plurality of devices, the major surface having a first surface portion for directing the one or more of the wavelengths from one or more of the plurality of devices incident thereon toward the sensor, and a second surface portion for preventing the one or more wavelengths from the one or more of the plurality of devices from impinging on the sensor. A system responsive to material flow acts on the member to rotate the member about its axis when the system responds to flow of material, wherein as the member rotates about its axis, the first and the second surface portions of the member move relative to the sensor and each one of the plurality of the devices.

In a non-limiting embodiment of the invention, the meter register includes a sealed container having the encoder, the system responsive to material flow, a microprocessor, and an electrical power unit therein. A housing having a first end for connection to a material flow inlet and a second end for connection to a material flow outlet, and a chamber through which material flows as it moves between the ends of the housing. The meter register is mounted in the housing. A flow detector mounted in the chamber of the housing has a magnet which is rotated as the material flows through the chamber. The rotation of the magnet of the flow detector rotates the magnet of the meter register to rotate the member of the encoder.

In a further non-limiting embodiment of the invention, the meter register includes a microprocessor having an algorithm and a signal generator that transmits the flow of the material through the chamber as measured by the encoder. The algorithm makes the signal generator inoperative until a predetermined amount of material has passed through the chamber.

Still further, the invention relates to a utility meter register that transmits a radio frequency signal that includes an arrangement that, once activated, prevents a meter register from transmitting a signal until the meter register measures a fixed amount of volume passing through the meter body, at which time the meter register will transmit a radio frequency signal. The present invention is also a water meter having a sealed meter register. The meter body has a magnetic drive wheel that co-acts with a follower wheel of the meter register. The follower wheel co-acts with another wheel having a magnet attached thereto. A sensor, such as a reed switch, is positioned in close proximity to the wheel so that the magnet activates the reed switch every time it rotates about an axis. The sensor is coupled to a microprocessor which detects a complete revolution of the magnet. The meter register will begin transmitting a radio signal after about one or more, and more preferably three, complete revolutions of the magnet.

In a non-limiting embodiment of the invention, the meter register includes a device for detecting flow of material and generating a first signal representative of material flow; a microprocessor for receiving the first signal and acting on the first signal to determine the amount of flowed material and generating a second signal representative of the amount of flowed material, the microprocessor further includes an algorithm and a transmitter operated on by the algorithm to change the transmitter from a non-transmitting state to a transmitting state, wherein the meter changes from the non-transmitting to the transmitting state after the microprocessor has determined that the device for detecting flow of a material has detected the flow of a predetermined amount of material.

The invention also relates to a method of blocking the transmission of a signal from a meter register, the meter register having a measuring system for material flow moving past the meter register. The method includes the steps of calibrating the meter register; transmitting a signal to the meter register from an external source to a microprocessor contained in the meter register to block the microprocessor from forwarding signals to an antenna of the meter register; installing the meter register to measure material flow; using the meter register to measure the material flowing past the meter register; forwarding a signal of measured material flow to the microprocessor and, after passing of a predetermined amount of material past the meter register, the microprocessor is unblocked and the microprocessor forwards signals to the antenna.

DETAILED DESCRIPTION OF THE INVENTION

Figure 1:
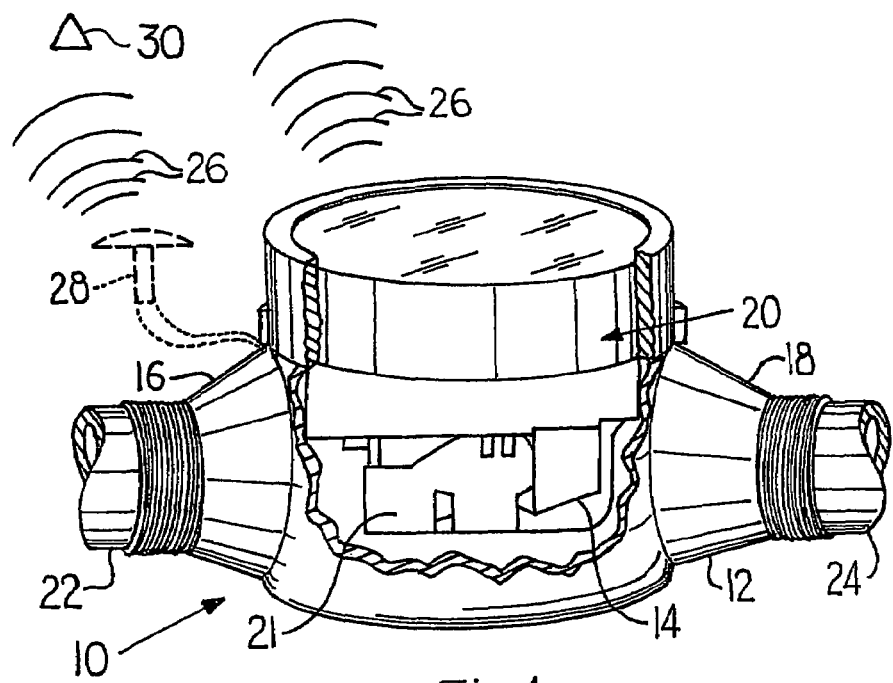
FIG. 1 is a schematic representation of the meter register and auxiliary antenna made in accordance with the present invention.

In the following discussion of the non-limiting embodiments of the invention, spatial or directional terms, such as "inner", "outer", "left", "right", "up", "down", "horizontal", "vertical", and the like, relate to the invention as it is shown in the drawing figures. However, it is to be understood that the invention can assume various alternative orientations and, accordingly, such terms are not to be considered as limiting. Further, all numbers expressing dimensions, physical characteristics, and so forth, used in the specification and claims are to be understood as being modified in all instances by the term "about". Accordingly, unless indicated to the contrary, the numerical values set forth in the following specification and claims can vary depending upon the desired properties sought to be obtained by the practice of the invention. At the very least, and not as an attempt to limit the application of the doctrine of equivalents to the scope of the claims, each numerical parameter should at least be construed in light of the number of reported significant digits and by applying ordinary rounding techniques. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, and all subranges in between, e.g., 1 to 6.3, or 5.5 to 10, or 2.7 to 6.1. Also, as used herein, terms such as "positioned on" or "supported on" mean positioned or supported on but not necessarily in direct contact with the surface.

Further, in the discussion of the non-limiting embodiments of the invention, it is understood that the invention is not limited in its application to the details of the particular non-limiting embodiments shown and discussed since the invention is capable of other embodiments. Further, the terminology used herein is for the purpose of description and not of limitation and, unless indicated otherwise, like reference numbers refer to like elements.

The non-limiting embodiments of the invention are discussed for use on a water meter; however, as will be appreciated, the invention is not limited thereto, and the non-limiting embodiments of the invention can be used with any type of signal transmitting device, e.g., but not limiting the invention thereto, any type of signal transmitting meter measuring the movement of materials, e.g., but not limiting the invention thereto, fluids such as water and gas. Although not limiting to the invention, the water meter in the following discussion is of the type disclosed in WO 02/073735, which document is hereby incorporated by reference. FIG. 1 herein, which is similar to FIG. 21 of WO 02/073735, shows a water meter 10 having a body 12, a measuring chamber 14, an inlet connection 16, an outlet connection 18, and a meter register 20 incorporating features of the invention. A general discussion of the water meter disclosed in WO 02/073735 is presented herein; for a detailed discussion of the water meter, reference can be made to WO 02/073735.

The body 12 of the water meter 10 is preferably made of a metallic material, such as bronze, copper, or stainless steel, although it can be made of other materials, such as plastic.

The measuring chamber 14 can contain any one of the measuring-type arrangements known in the art, such as positive displacement arrangement and/or a vane or a multi-jet type displacement arrangement. The inlet connection 16 and the outlet connection 18 are adapted to be secured to pipes 22 and 24, respectively. The meter register 20 is preferably sealed and is preferably magnetically coupled to the magnetic drive arrangement 21 in the measuring chamber 14. Magnetic drive arrangements are well known in the art and no further discussion is deemed necessary. The meter register 20 of the water meter 10 may include an antenna and/or receiver to transmit and/or receive RF signals, e.g., radio waves 26, respectively, and when the meter is mounted in a pit (not shown), an auxiliary antenna and/or receiver 28, shown in phantom in FIG. 1, is used to mount the antenna and/or receiver outside of the pit. The radio waves 26 are received by a transmission and/or receiving arrangement, e.g., mounted on a stationary tower 30 or on a moving vehicle.

Figure 2:
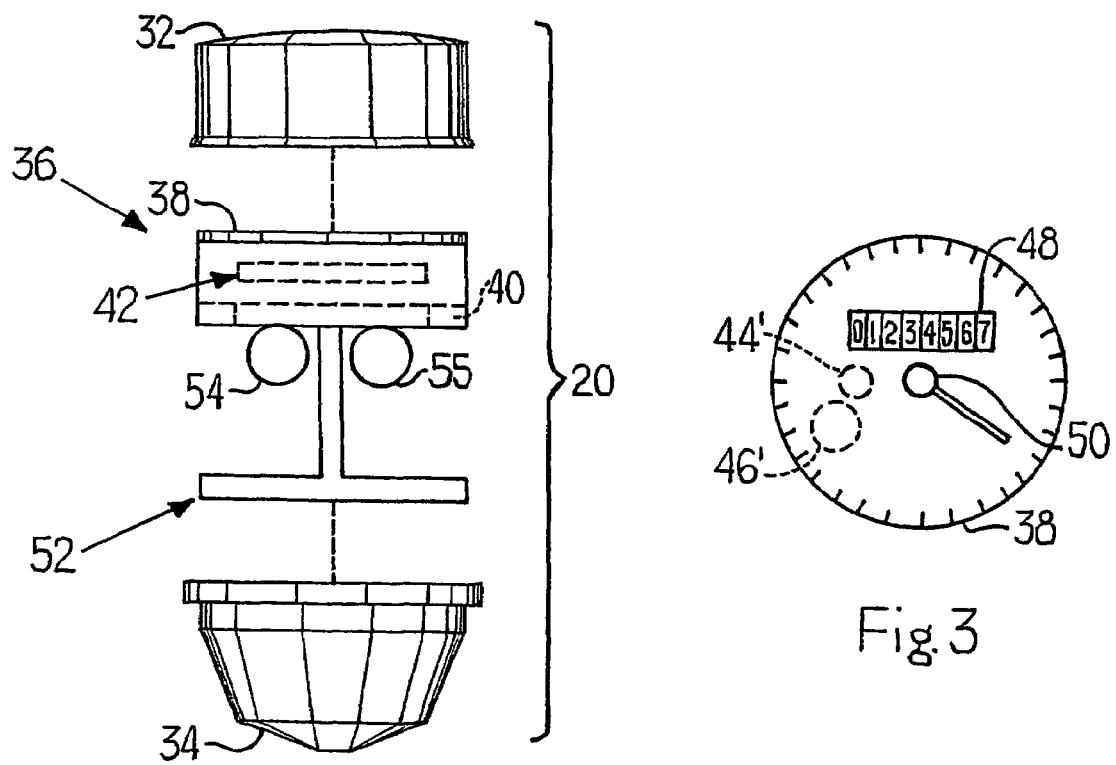
FIG. 2 is an exploded side elevational view, partially in section, of the register shown in FIG. 1.

With reference to FIG. 2, the register 20 includes a face cap 32 mechanically sealed to a cup 34 in any convenient manner. Preferably, the face cap 32 is made of glass or a clear polymeric material, and the cup 34 is made of metal, e.g., but not limiting the invention thereto, copper or stainless steel. Optionally, the metal cup 34 is received in a polymeric shroud (not shown).

Figure 3:
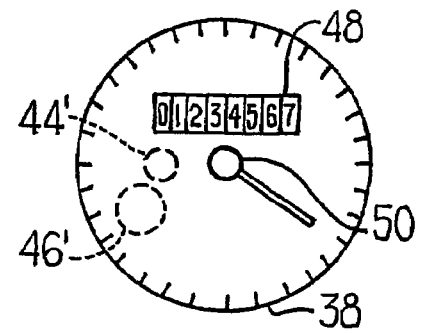
FIG. 3 is a top perspective view of a face plate and odometer of the register shown in FIGS. 1 and 2.

Referring to FIGS. 2 and 3, within the face cap 32 and the cap 34, the meter register 20 includes a register subassembly 36. The register subassembly 36 includes a faceplate 38, a gear train drive 40, and a direction detection arrangement 42 incorporating features of the invention. The gear train drive 40 is coupled to a gear drive 44 positioned on the back of the faceplate 38. The gear drive 44 includes meshed gears 46 which drives both an odometer 48 and rotates a sweep hand 50. The gear train drive 40 is powered by a magnetic drive arrangement 52 of the type used in the art, and the electronics of the direction detection arrangement 42 are powered by batteries 54 and 55.

With reference to FIGS. 4-7, the direction detection arrangement 42 of the invention includes a circuit board 56 having an optical encoder 58 (see FIGS. 6 and 7) of the invention and electronics 62 that receive input from the optical encoder 58, calculates the water consumption, and forwards the information to an antenna (not shown), and the antenna transmits the information in the form of the radio waves 26. The invention is not limited to the electronics for calculating water consumption and/or the antenna design for sending the radio waves, and any of the types known in the art may be used in the practice of the invention, e.g., but not limiting to the invention thereto, the embodiments of the electronics and antenna designs discussed in WO 02/073735, and used in meter registers sold by Master Meter, Inc. and Arad Technologies Ltd. under the trademark Dialog 3G. Although the Dialog 3G meter register uses reed switches as discussed in WO 02/073735, to measure water consumption, the optical encoder of the instant invention can be used in the Dialog 3G in place of the reed switches.

Figure 4:
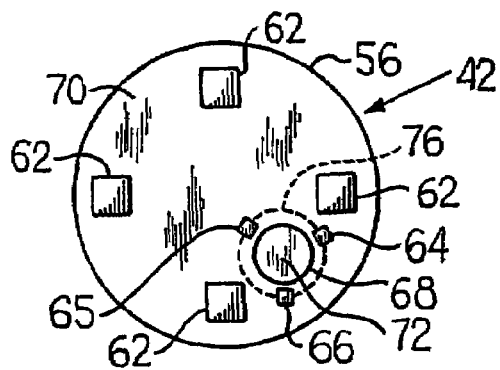
FIG. 4 is a top plan view of a circuit board utilized in the register shown in FIG. 2.

The circuit board 56 further includes three electromagnetic wave emitters 64-66 (see FIGS. 4 and 7) positioned approximately 120° apart around a hole 68 defined in the circuit board 56. As can be appreciated, the invention is not limited to the type of emitters used and the wavelength of the energy emitted. For example, but not limiting to the invention, the emitters can emit energy of any wavelength of the electromagnetic spectrum; the invention, however, is not limited thereto and emitters that emit energy in the visible range of the electromagnetic spectrum can be used in the practice of the invention. The emitters 64-66 are attached to upper surface 70 of the circuit board 56. An infrared sensor 72 is attached to lower surface 74 of the circuit board 56 (shown in FIG. 7) so that the sensor 72 closes the hole 68 as shown in FIG. 4. As can be appreciated, the configuration of the hole is not limiting to the invention and the hole can be circular as shown in FIG. 4, elliptical, or polygonal having any number of sides or an opening having an open side portion instead of all closed sides. The sensor 72 and the emitters 64-66 are co-axial with an axis X (shown only in FIG. 7). Further, the emitters 64-66 are positioned about a circle 76 (shown only in FIG. 4 and shown in phantom) which is, likewise, co-axial with the axis X.

Figure 5:
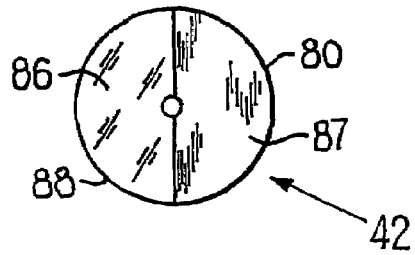
FIG. 5 is a top plan view of a wheel used with the register shown in FIG. 2.
Figure 6:
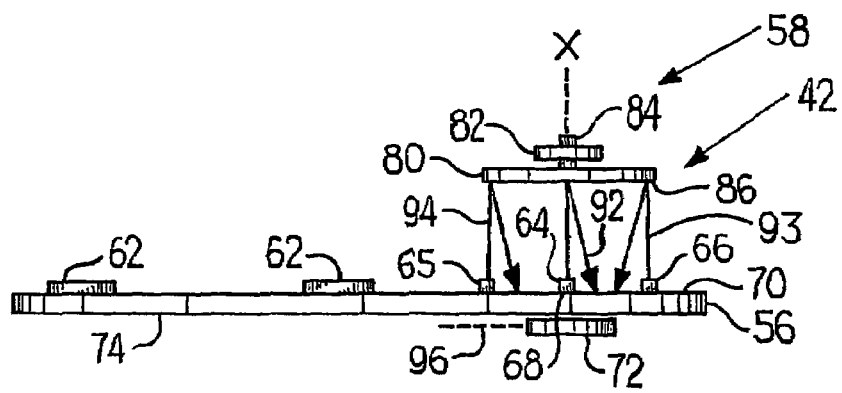
FIG. 6 is a side elevational view of a portion of the register shown in FIG. 2, wherein the wheel and circuit board are shown.
Figure 7:
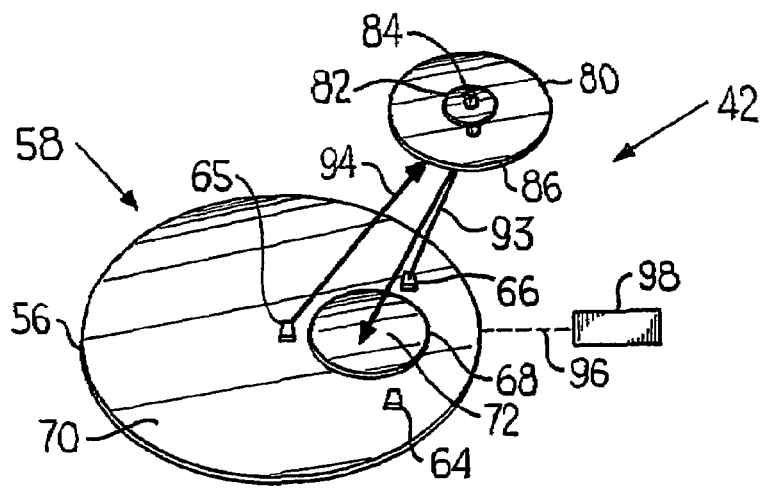
FIG. 7 is a top perspective view of the wheel and the circuit board shown in FIG. 8.

With reference to FIGS. 5-7, a detector wheel 80 is positioned above the emitters 64-66 and is driven in any convenient manner by the magnetic drive arrangement 52 such that as the magnetic drive arrangement 52 causes the detector wheel 80 to rotate about the X axis. The powering arrangement for moving the detector wheel 80 is not limiting to the invention and can be accomplished by the magnetic drive arrangement 52 driving the gear train drive 40 to rotate, directly or indirectly, gear 82 mounted on shaft 84 mounted to the center of the detector wheel 80. As shown in FIG. 5, bottom surface 86 of the detector wheel 80 has a reflective surface 87 and a non-reflective surface 88. For example, but not limiting to the invention, the reflective surface 87 can be a shiny mirror-like material and the non-reflective surface 88 can be coated black. As can be appreciated, the invention is not limited to having a reflective surface and a non-reflective surface, e.g., but not limiting to the invention, the non-reflective surface 88 can be a reflective surface angled with respect to the sensor surface to reflect beams incident thereon away from the sensor surface.

As can be seen in FIG. 6, the detector wheel 80 is spaced from the upper surface 70 of the circuit board 56 with the reflective surface 87 and the non-reflective surface 88 positioned above and facing the emitters 64-66. The emitters 64-66 are oriented with respect to the detector wheel 80 so that the emitted rays 92-94 from the detectors 64-66 impinge on the bottom surface 86 of the detector wheel 80 and are spaced 120° apart. The rays impinging on the reflective surface 87 are reflected from the reflective surface to the sensor 72. The sensor 72 is coupled via a wire 96 to a microprocessor 98 of the electronics 62. Although not limiting to the invention, in the preferred embodiment of the invention, the emitters 64-66 are powered by signals from the microprocessor 98 to the batteries and the emitters.

In operation, the microprocessor 98 will only activate two emitters at a time. More specifically, each emitter of the two emitters activated at one time will actually be activated and deactivated individually in short intervals. If the microprocessor 98 detects reflection from both emitters impinging on the sensor 72, then the emitters are reactivated again. Once the microprocessor does not detect reflection from one of the emitters, the other emitter, which had been off during the whole sequence, is then activated and the emitter, which did not have any reflection, is deactivated. This is because the newly deactivated emitter has its emitted infrared rays hitting the non-reflective surface 90 of the detector wheel 80. This process continues until the infrared rays of another one of the emitters is sensed by the microprocessor to be impinging on the non-reflective surface 90 of the detector wheel 80. Tables 1 and 2 below show various sequences indicating clockwise flow or positive flow (Table 1), as well as counterclockwise flow or reverse flow (Table 2).

TABLE 1

Status of Emitters and Rays Incident on the Detector Wheel as the Detector Wheel 80 Moves in a Clockwise Direction.

| Period | Emitter 64 | Emitter 65 | Emitter 66 |
| --- | --- | --- | --- |
| 1 | On ref | On ref | Off |
| 2 | Off | Off | Off |
| 3 | On no ref | On ref | Off |
| 4 | Off | Off | Off |
| 5 | Off | On ref | On ref |
| 6 | Off | Off | Off |
| 7 | Off | On no ref | On ref |
| 8 | Off | Off | Off |
| 9 | On ref | Off | On ref |
| 10 | Off | Off | Off |
| 11 | On ref | Off | On no ref |
| 12 | Off | Off | Off |
| 1 | On ref | On ref | Off |
| 2 | Off | Off | Off |
| 3 | On no ref | On ref | Off |
| 4 | Off | Off | Off |
| 5 | Off | On ref | On ref |
| 6 | Off | Off | Off |

On Table 1, the listing of the emitters is 64, 66, and 65 which is the sequence with the detector wheel rotating in the clockwise direction. The designation "off" means that the emitters are turned off. The designation "on ref" means that the emitter is turned on and the ray of the emitter is incident on the reflective surface 87 of the detector wheel 80. The designation "on no ref" means that the emitter is turned on and the ray of the emitter is incident on the non-reflective surface 88 of the detector wheel 80. One cycle is 12 periods.

TABLE 2

Status of the Emitters and Rays Incident on the Detector Wheel as the Detector Wheel 80 Moves in a Counterclockwise Direction

| Period | Emitter 64 | Emitter 65 | Emitter 66 |
| --- | --- | --- | --- |
| 1 | On ref | On ref | Off |
| 2 | Off | Off | Off |
| 3 | On ref | On no ref | Off |
| 4 | Off | Off | Off |
| 5 | On ref | Off | On ref |
| 6 | Off | Off | Off |
| 7 | On no ref | Off | On ref |
| 8 | Off | Off | Off |
| 9 | Off | On ref | On ref |
| 10 | Off | Off | Off |
| 11 | Off | On ref | On no ref |
| 12 | Off | Off | Off |
| 1 | On ref | On ref | Off |
| 2 | Off | Off | Off |
| 3 | On ref | On no ref | Off |
| 4 | Off | Off | Off |
| 5 | On ref | Off | On ref |
| 6 | Off | Off | Off |

On Table 2, the listing of the emitters is 64, 65, and 66 which is the sequence with the detector wheel rotating in the counterclockwise direction. The designations "off", "on ref" and "on no ref" have the meaning given above. One cycle is 12 periods.

The flow volume through the meter 10 can be determined by measuring the time it takes to complete one period.

Preferably, the calculated result has an accuracy of 60° of the wheel, which then can correspond to a volume flow and a volume flow rate through the meter. In the practice of the invention, but not limiting thereto, it is preferred to activate the emitters (emitters on) for 200 nanoseconds and deactivate the emitters (emitters off) for 125 milliseconds. It is found that in this arrangement the life of the batteries 54 and 55 are increased.

Although the two magnetic reed switch designs disclosed in WO 02/073735 is acceptable, the encoder of the invention can detect flow through the meter more accurately than the two magnetic reed switch designs described in the WO 02/073735 because three emitters are used with a rotating detector instead of two reed switches activated by a rotating magnetic. Further, the encoder of the present invention can determine a leak with more accuracy than the prior art flow detectors. Specifically, the encoder of the invention can determine a very slow rotation of the detector wheel 80 over a long period of time, which is indicative of a leak, for example, a water leak. Further, the encoder of the present invention uses considerably less electrical power than the prior art magnetic activated reed switch arrangement, resulting in longer battery life.

As can be appreciated by those skilled in the art, the register disclosed in WO 02/073735 can be modified to use the encoder of the present invention by replacing the magnetic reed switches with the circuit board 56 (see FIG. 4) having the infrared sensor 72 and the emitters 64-66, and replacing the wheel for rotating the magnet to activate and deactivate the reed switches with the detector wheel 80.

Another non-limiting embodiment of the invention is to prevent the meter register from transmitting radio waves during transport of the meter register and/or of a water meter having the meter register until the meter register and/or water meter having the register is installed and used, i.e., measuring flow through the meter. In accordance to this embodiment of the invention, the foregoing is accomplished by installing an algorithm in the meter register, i.e., in the microprocessor 98 that prevents or blocks the microprocessor from sending signals to the antenna of the meter register until the meter is put into service.

Figure 10:
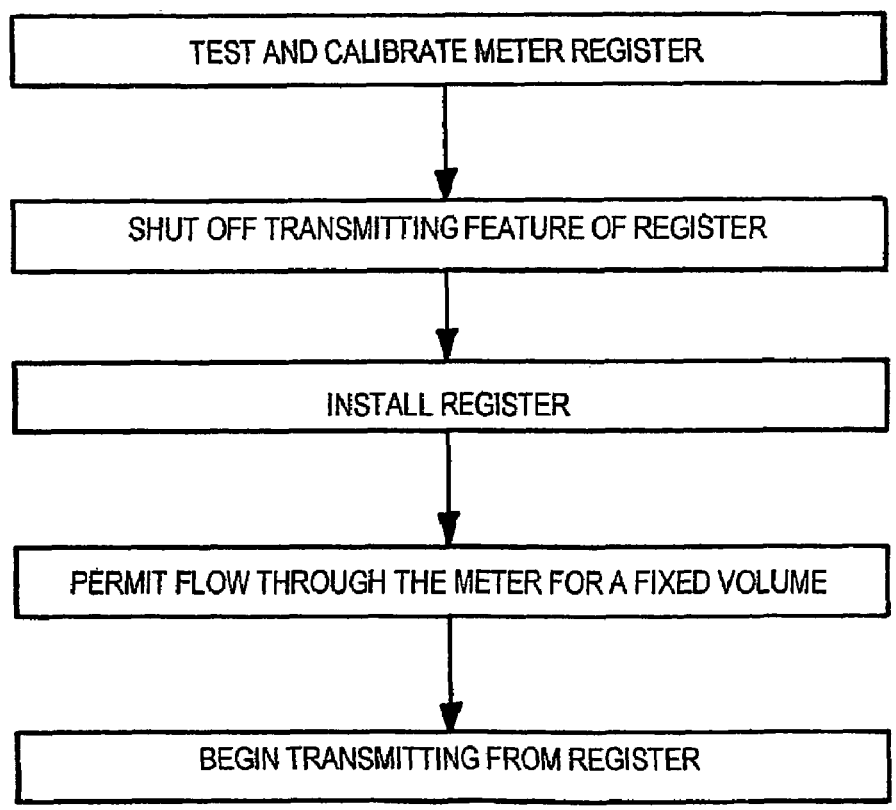
FIG. 10 is a flow diagram identifying the steps of operation of the present invention.

In the practice of this embodiment of the invention, a water meter, e.g., the water meter 10, having the meter register 20 having features of the invention are tested at a test facility. After the meter 10 is calibrated, a signal is transmitted to the meter register 20 from an external source and received by the microprocessor 98 to deactivate the transmitting and receiving feature of the register 20, e.g., block the microprocessor from forwarding signals to the antenna. With the transmitting and receiving features of the register 20 blocked, the meter 10 can be transported throughout the United States pursuant to the FCC rules. After the meter is installed at an installation site, such as in a pit or a house, water or gas or any other material which will pass through the meter is permitted to pass through the meter 10 causing the measuring drive arrangement 21 in the measuring chamber 14 to drive the magnetic drive arrangement 52 (see FIG. 2) of the meter register to operate the register 20 to measure the material flow through the meter 10 as previously discussed. As the material flows through the meter, the microprocessor 98 receives a signal from the infrared sensor 72 of the encoder 58 that water is moving through the meter. The microprocessor 98 continues to monitor the activity of the infrared sensor 72 until a predetermined number of periods or cycles (see Tables 1 and 2) have passed, after which the microprocessor 98 activates the transmitting and receiving features of the register 20. The meter register can now send radio waves 26 to a receiver. Preferably, the meter register continues to send signals and will not revert to the deactivated state unless instructed to do so by an external instruction. As can now be appreciated, an algorithm is used to activate the transmitting and receiving features of the meter register 20. FIG. 10 is a flow diagram identifying the steps of operation of the present invention.

Figure 8:
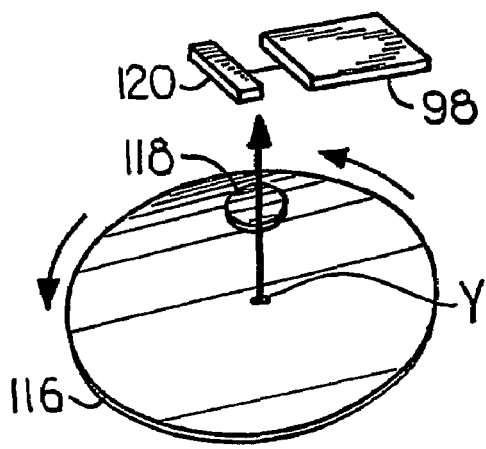
FIG. 8 has a schematic view of a register wheel having a magnet attached thereto with a sensor.
Figure 9:
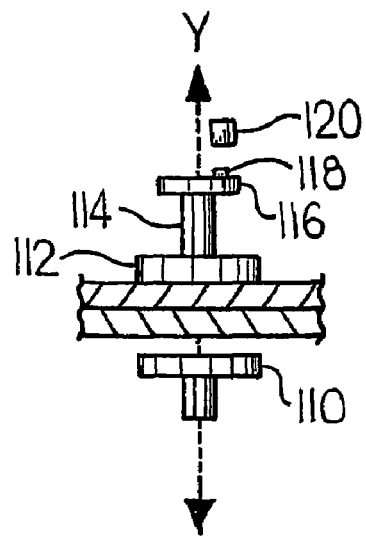
FIG. 9 is a side elevational view, partially sectioned, of a portion of the register and the meter body made in accordance with the present invention.

The invention further contemplates using other types of sensors to activate the transmitting and receiving features of the meter register. With reference to FIGS. 8 and 9, there is shown a drive magnet 110 connected to the drive arrangement 21 in the measuring chamber 14 of the meter 10, e.g., a multi-jet arrangement. The meter register 20 has a follower magnet 112 which co-acts with the drive magnet 110. The follower magnet 112 includes a shaft 114 that is attached to a wheel 116. The drive magnet 110, follower magnet 112, the shaft 114, and the wheel 116 rotate about an axis Y as material flows through the meter body. A magnet 118 is secured to the wheel 116 near the outer perimeter. Hence, as the wheel 116 rotates about the axis Y, so does the magnet 118. A sensor 120, such as a reed switch, is positioned above the wheel 116, as shown in FIG. 9. Depending on the position of the magnet 118, the reed switch 120 will either be activated or deactivated. Hence, during one revolution of the wheel, the reed switch 120 will be activated for a period of time, deactivated, and then reactivated again, or deactivated, reactivated, and deactivated again. Upon a complete cycle of the sequences, it is indicative of a complete rotation of the wheel 116. The sensor reed switch 120 is electrically coupled to a microprocessor 98 which is electrically coupled to a signal transmitting and receiving arrangement, such as that utilized in the Dialog 3G meter register As can be appreciated, the invention is not limited to the use of an encoder having electromagnetic wave emitters, e.g., infrared emitters or light emitters, and a magnetic reed switch sensor, but can be used with other types of activating systems that measure the flow of material and generate a useable indicator of material flow. Alternatively, the signal transmitting and receiving arrangement of the meter register can be activated based upon the requirement of more than one rotation of the wheel 116, or less than one rotation of the wheel 116, or less than one cycle of the encoder.

The form of the invention shown and described above represents illustrative non-limiting embodiments of the invention. It is understood that various changes may be made without departing from the teachings of the invention defined by the claimed subject matter that follows.

The invention claimed is:

1. A meter register, comprising:
    a register body having a rotatable drive shaft coupled thereto, a drive magnet attached to the drive shaft, at least one wheel co-acting with the drive shaft, the wheel having a first surface and an opposite second surface, and a reflective surface and a non-reflective surface on the second surface of the wheel;
    a plurality of optical emitters in facing relation to the second surface of the wheel and spaced about an axis which the wheel rotates, wherein the emitters are adapted to emit radiation on the reflective and non-reflective surfaces; and
    a single sensor mounted in facing relationship to the second surface of the wheel, wherein the plurality of emitters are between the second surface of the wheel and the sensor, the sensor adapted to co-act with reflected radiation from the reflective surface, whereby in operation when the drive shaft rotates, the wheel rotates about the axis and one or more emitters emit radiation that is reflected from the wheel to the sensor for a determination of flow through the meter and direction of flow.

2. The meter register as claimed in claim 1, wherein the radiation is light.

3. The meter register as claimed in claim 2, wherein the light is infrared light.

4. A meter register comprising:
    an optical encoder responsive to material flow, the optical encoder comprising:
    a single sensor responsive to one or more wavelengths of the electromagnetic spectrum, the sensor having a perimeter;
    a plurality of devices mounted in a fixed spaced relationship to one another and to the perimeter of the sensor, each of the devices capable of generating the one or more wavelengths of the electromagnetic spectrum; and
    a member mounted to rotate about an axis and having a major surface with the major surface spaced from and facing the single sensor and the plurality of devices, the major surface having a first surface portion for directing the one or more of the wavelengths from one or more of the plurality of devices incident thereon toward the sensor, and a second surface portion for preventing the one or more wavelengths from the one or more of the plurality of devices from impinging on the sensor, wherein the plurality of devices is positioned between the member and the sensor such that the one or more wavelengths of the electromagnetic spectrum directed toward the member, and reflected from the member are reflected toward and past the plurality of devices to impinge on the sensor; and
    a system responsive to material flow acting on the member to rotate the member about its axis when the system responds to flow of material, wherein as the member rotates about its axis, the first and the second surface portions of the member move relative to the sensor and each one of the plurality of the devices.

5. The meter register as claimed in claim 4, wherein the plurality of devices is each capable of generating infrared energy.

6. The meter register as claimed in claim 4, wherein the plurality of devices is three devices positioned in a circle and spaced 120°.

7. The meter register as claimed in claim 6, further comprising a support having a first surface and a second opposite surface with a hole extending through a body of the support from the first surface to the second surface, wherein the three devices are mounted on the first surface of the support with the circle circumscribing the hole and the sensor adjacent the second surface of the support overlaying the hole, wherein the axis about which the member rotates and an axis through center of the circle are coincident axes.

8. The meter register as claimed in claim 7, wherein the one or more wavelengths are one or more wavelengths in the infrared wavelength range of the electromagnetic spectrum.

9. The meter register as claimed in claim 7, wherein the one or more wavelengths are one or more wavelengths in the visible wavelength range of the electromagnetic spectrum.

10. The meter register as claimed in claim 7, wherein the first surface portion of the major surface of the member is a reflective surface and the second surface portion of the major surface of the member is a non-reflective surface.

11. The meter register as claimed in claim 4, further comprising a microprocessor connected to the sensor.

12. The meter register as claimed in claim 11, further comprising an electrical power unit to power the devices and the microprocessor.

13. The meter register as claimed in claim 12, wherein the microprocessor is electrically connected to the sensor and to each of the devices.

14. The meter register as claimed in claim 13, wherein the system responsive to material flow comprises a drive arrangement having a magnet spaced from a gear drive.

15. The meter register as claimed in claim 14, wherein the meter register includes a sealed container having the encoder, the system responsive to material flow, the microprocessor and the electrical power unit therein, and further comprising a housing having a first end for connection to a material flow inlet and a second end for connection to a material flow outlet, a chamber through which material flows as it moves between the ends of the housing, the meter register mounted in the housing and a flow detector having a magnet which is rotated as the material flows through the chamber between the ends, wherein rotation of the magnet of the detector rotates the magnet of the meter register to rotate the member of the encoder.

16. A meter register comprising:
   an encoder responsive to material flow, the optical encoder comprising:
      a sensor responsive to one or more wavelengths of the electromagnetic spectrum, the sensor having a perimeter;
      a plurality of devices mounted in a fixed spaced relationship to one another and to the perimeter of the sensor, each of the devices capable of generating the one or wavelengths of the electromagnetic spectrum;
      a microprocessor electrically connected to the sensor and to each of the devices: and
      a member mounted to rotate about an axis and having a major surface with the major surface spaced from and facing the sensor and the plurality of devices, the major surface having a first surface portion for directing the one or more of the wavelengths from one or more of the plurality of devices incident thereon toward the sensor, and a second surface portion for preventing the one or more wavelengths from the one or more of the plurality of devices from impinging on the sensor; and
   a system responsive to material flow acting on the member to rotate the member about its axis when the system responds to flow of material, wherein as the member rotates about its axis, the first and the second surface portions of the member move relative to the sensor and each one of the plurality of the devices, wherein the system responsive to material flow comprises a drive arrangement having a magnet spaced from a gear drive;
   an electric power unit to power the devices and the microprocessor; and
   wherein the meter register includes a sealed container having the encoder, the system responsive to material flow, the microprocessor and the electrical power unit therein, and further comprising a housing having a first end for connection to a material flow inlet and a second end for connection to a material flow outlet, a chamber through which material flows as it moves between the ends of the housing, the meter register mounted in the housing and a low detector having a magnet which is rotated as the material flows through the chamber between the ends, wherein rotation of the magnet of the detector rotates the magnet of the meter register to rotate the member of the encoder: and
   wherein the microprocessor includes a signal generator that transmits the flow of the material through the chamber as measured by the encoder and includes an algorithm for making the signal generator inoperative until a predetermined amount of material has passed through the chamber.

17. The meter register as claimed in claim 16, wherein the material is water and the predetermined amount of water is measured by the encoder.

18. The meter register as claimed in claim 16, wherein the encoder is a first measuring system and further including a second measuring system to measure the predetermined amount of material.

19. The meter register as claimed in claim 18, wherein the second measuring system includes an optical measuring system.

20. The meter register as claimed in claim 18, wherein the second measuring system includes a magnet mounted wheel and a reed switch mounted in a fixed relation to the circumference of the wheel such that rotation of the wheel moves the magnet past the reed switch to change the status of the reed switch.

21. The meter register as claimed in claim 4, wherein the material is water and the plurality of devices are three devices positioned in a circle and spaced 120° and the one or more wavelengths are selected from the group of the infrared wavelength range and the visible wavelength range of the electromagnetic spectrum:
   further comprising a support having a first surface and a second opposite surface with a hole extending through the body of the support from the first surface to the second surface, wherein the three devices are mounted on the first surface of the support with the circle circumscribing the hole and the sensor adjacent the second surface of the support overlaying the hole, wherein the axis about which the member rotates and an axis through center of the circle are coincident axes, wherein the first surface portion of the major surface of the member is a reflective surface and the second surface portion of the major surface of the member is a non-reflective surface;
   further comprising a microprocessor connected to the sensor, an electrical power unit to power the devices and the microprocessor, the microprocessor electrically connected to the sensor and to each of the devices, and
   wherein the system responsive to material flow comprises a drive arrangement having a magnet at one end and a gear arrangement at the other end.

22. The meter register as claimed in claim 21, further comprising a housing having a first end for connection to a material flow inlet and a second end for connection to a material flow outlet, a chamber through which material flows as it moves between the ends of the housing, the system responsive to material flow mounted in the housing and a flow detector having a magnet which is rotated as the material flows through the chamber between the ends, wherein rotation of the magnet of the detector rotates the magnet of the system to rotate the member of the optical encoder.

23. A meter register comprising:
   an encoder responsive to water flow, the optical encoder comprising:
   a sensor responsive to one or more wavelengths of the electromagnetic spectrum, the sensor having a perimeter;
   three devices positioned in a circle and spaced 120° and the one or more wavelengths of the electromagnetic spectrum are selected from the group of the infrared wavelength range and the visible wavelength range of the electromagnetic spectrum, each of the devices capable of generating the one or more wavelengths of the electromagnetic spectrum;
   a support having a first surface and a second opposite surface with a hole extending through the body of the support from the first surface to the second surface, wherein the three devices are mounted on the first surface of the support with the circle circumscribing the hole and the sensor adjacent the second surface of the support overlaying the hole, wherein the axis about which the member rotates and an axis through center of the circle are coincident axes, wherein the first surface portion of the major surface of the member is a reflective surface and the second surface portion of the major surface of the member is a non-reflective surface; further comprising a microprocessor connected to the sensor, an electrical power unit to power the devices and the microprocessor, the microprocessor electrically connected to the sensor and to each of the devices, and wherein the system responsive to water flow comprises a drive arrangement having a magnet at one end and a gear arrangement at the other end;

a microprocessor electrically connected to the sensor and to each of the devices; and a member mounted to rotate about an axis and having a major surface with the major surface spaced from and facing the sensor and the plurality of devices, the major surface having a first surface portion for directing the one or more of the wavelengths from one or more of the plurality of devices incident thereon toward the sensor, and a second surface portion for preventing the one or more wavelengths from the one or more of the plurality of devices from impinging on the sensor; and an electrical power unit to power the devices and the microprocessor;

a system responsive to water flow comprises a drive arrangement having a magnet at one end and a gear arrangement at the other end to act on the member to rotate the member about its axis when the system responds to flow of water, wherein as the member rotates about its axis, the first and the second surface portions of the member move relative to the sensor and each one of the plurality of the devices; and wherein the microprocessor includes a signal generator that transmits the flow of the material through the chamber as measured by the encoder and includes an algorithm for making the signal generator inoperative until a predetermined amount of material has passed through the chamber and the predetermined amount of water is measured by a measuring system selected from the group of (1) the encoder, (2) an optical measuring system other than the encoder, and (3) a magnet mounted on a wheel and a reed switch mounted in a fixed relationship to the circumference of the wheel, such rotation of the wheel moves the magnet past the reed switch to change the status of the reed switch.

24. A meter register for coupling with a meter, the meter having components adapted to transmit radio waves as material passes through the meter, the meter register adapted to generate an algorithm to act on components of the meter to prevent the components of the meter from transmitting the radio waves until the components determine that a particular amount of material passes through the meter.

25. The meter register as claimed in claim 4, further comprising a microprocessor comprising a signal generator that transmits the flow of the material as measured by the encoder and an algorithm for making the signal generator inoperative until a predetermined amount of material has been measured by the encoder.

* * * * *

UNITED STATES PATENT AND TRADEMARK OFFICE
CERTIFICATE OF CORRECTION

| | | |
|---|---|---|
| PATENT NO. | : 7,663,503 B2 | Page 1 of 1 |
| APPLICATION NO. | : 11/581877 | |
| DATED | : February 16, 2010 | |
| INVENTOR(S) | : Winter | |

It is certified that error appears in the above-identified patent and that said Letters Patent is hereby corrected as shown below:

Column 11, Line 25, Claim 16, "the one or wavelengths" should read
-- the one or more wavelengths --

Column 11, Line 57, Claim 16, "and a low detector" should read -- and a flow detector --

Signed and Sealed this

Twentieth Day of July, 2010

David J. Kappos
*Director of the United States Patent and Trademark Office*

UNITED STATES PATENT AND TRADEMARK OFFICE
CERTIFICATE OF CORRECTION

PATENT NO. : 7,663,503 B2  Page 1 of 1
APPLICATION NO. : 11/581877
DATED : February 16, 2010
INVENTOR(S) : Winter It is certified that error appears in the above-identified patent and that said Letters Patent is hereby corrected as shown below:

Title Page, Item [*]

Delete the phrase "by 427 days" and insert -- by 549 days --.

Signed and Sealed this

Thirty-first Day of August, 2010

David J. Kappos
*Director of the United States Patent and Trademark Office*